No. 855,939. PATENTED JUNE 4, 1907.
C. H. CRONK.
EGG CARRIER.
APPLICATION FILED OCT. 19, 1906.

2 SHEETS—SHEET 1.

WITNESSES:
E. F. Stewart
C. Bradway

Charles H. Cronk,
INVENTOR.
By C. A. Snow & Co.
ATTORNEYS

No. 855,939. PATENTED JUNE 4, 1907.
C. H. CRONK.
EGG CARRIER.
APPLICATION FILED OCT. 19, 1906.

2 SHEETS—SHEET 2.

WITNESSES:
E. F. Stewart
C. Bradway.

Charles H. Cronk, INVENTOR.
By C. A. Snow & Co.,
ATTORNEYS

UNITED STATES PATENT OFFICE.

CHARLES H. CRONK, OF CURTIS, NEBRASKA.

EGG-CARRIER.

No. 855,939.

Specification of Letters Patent.

Patented June 4, 1907.

Application filed October 19, 1906. Serial No. 339,697.

*To all whom it may concern:*

Be it known that I, CHARLES H. CRONK, a citizen of the United States, residing at Curtis, in the county of Frontier and State of Nebraska, have invented a new and useful Egg-Carrier, of which the following is a specification.

This invention relates to an egg carrier of that type in which the receptacle or holder for the eggs is suitably cushioned or elastically supported on a stable frame, so that the eggs can be transported to market without danger of breaking, due to shocks of the vehicle or car from roughnesses in the road.

One of the objects of the invention is to improve and simplify the construction and operation of devices of this character, so as to render them comparatively inexpensive and simple to manufacture and efficient and reliable in use.

A further object of the invention is to provide a suitable supporting frame upon which the egg receptacle or holder is elastically supported in a simple and satisfactory manner, and suitable means, such as a bail, being provided for conveniently carrying the device.

Another object is to provide an egg receptacle that is yieldingly mounted on the supporting frame and permanently attached thereto, so that the receptacle will always have an elastic mounting, since the receptacle cannot be taken up for carriage independently of the frame, the latter being of light construction so as not to add any material weight to the device.

With these objects in view, and others, as will appear as the nature of the invention is better understood, the invention comprises the various novel features of construction and arrangement of parts, which will be more fully described hereinafter, and set forth with particularity in the claims appended hereto.

Figure 1:
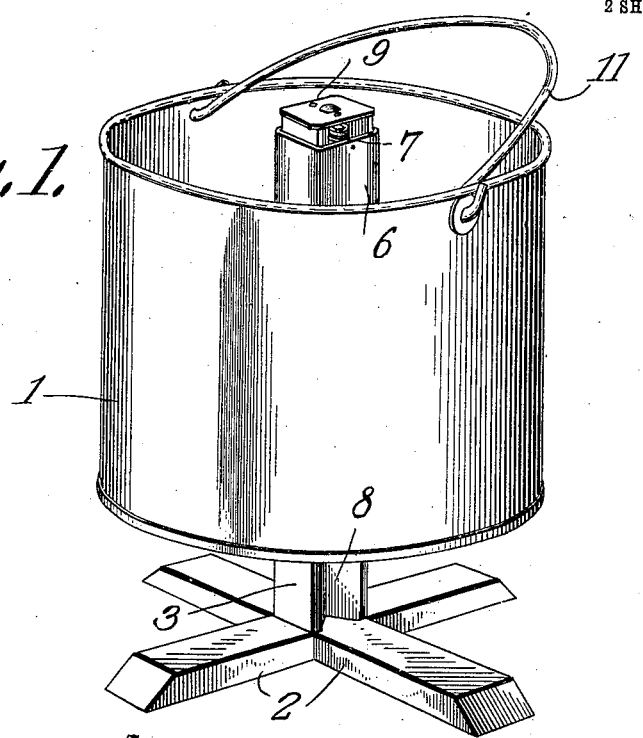
Figure 2:
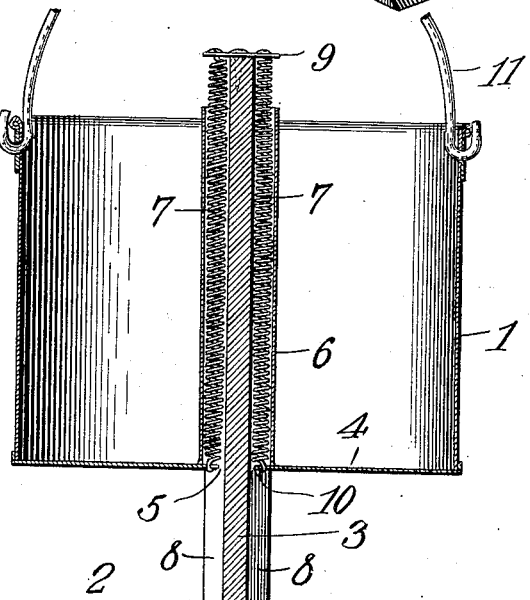
Figure 3:
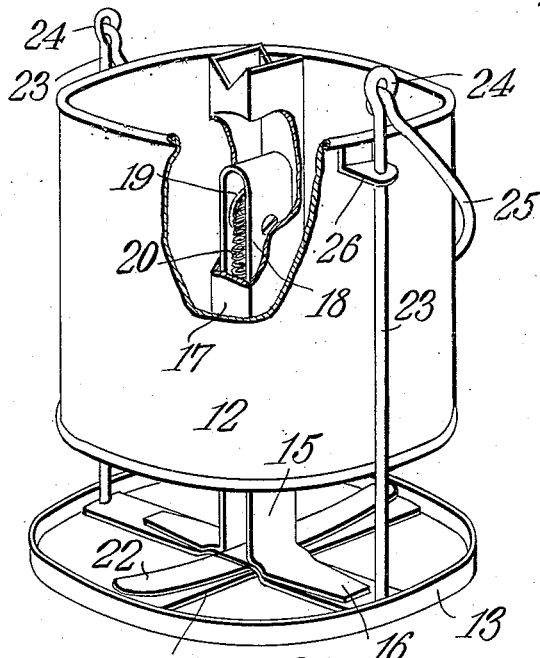
Figure 4:
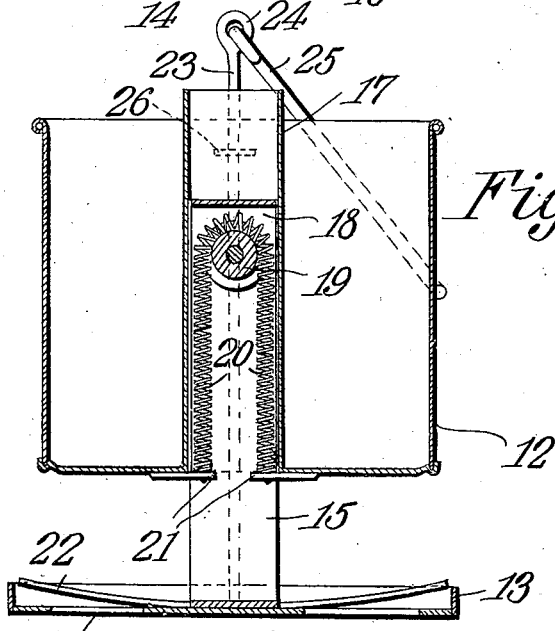

In the accompanying drawing, which illustrates one of the embodiments of the invention, Figure 1 is a perspective view of the egg carrier. Fig. 2 is a vertical central section thereof. Fig. 3 is a perspective view of another form of egg carrier, with portions broken away. Fig. 4 is a vertical central section thereof.

Corresponding parts in the figures are indicated throughout by similar characters of reference.

Referring to the drawing, 1 designates the receptacle of the carrier which may be of any suitable construction, such as a wooden or metal pail, bucket, or box, and made in different sizes, large sizes being provided for poultrymen so as to carry about thirty dozens of eggs, and small sizes sufficient to carry a dozen or more for the use of customers in carrying eggs home from the store. The carrier is intended, primarily, for use in cases where the eggs are conveyed in a vehicle where the jolting of the latter would have a tendency to break the eggs.

The supporting frame preferably comprises a cruciform base 2 and a central standard or upright 3, the base being of suitable size to give stability to the device. The supporting frame is preferably made of wood, and the standard 3 thereof passes centrally through the receptacle 1. As shown in Fig. 2, the bottom 4 of the receptacle is provided with a central opening 5 for receiving the standard 3, and rising from the bottom 4 is a sleeve 6 that serves as a guide for the receptacle on the standard. The standard 3 is of angular cross section and the sleeve 6 is of corresponding angular shape so as to prevent rotation of the holder or receptacle 1 on the stand or frame. The receptacle 1 is elastically supported on the standard by means of helical extension springs 7 which, at their upper ends, are anchored at the top extremity of the standard and at their lower ends are attached to the receptacle. Two such springs are found to be sufficient and they are arranged within the sleeve 6 and disposed in longitudinal recesses 8 on two opposite sides of the standard 3. The upper end of the standard is provided with a top plate 9 to which the springs are attached. This plate is large enough to engage the upper end of the sleeve 6 and serves as a stop for preventing the receptacle from pulling away or detaching from the stand. By removing the plate 9, the receptacle can be removed for the purpose of repairing the same or the stand, or the replacing of either by new ones. The bottom 4 is provided with ears or lugs 10 that project into the recesses 8 and afford means for attaching the lower ends of the springs to the receptacle. The springs 7 are of sufficient tension to prevent the receptacle with its maximum weight of contents from coming in contact with the base 2 of the supporting frame, so that shocks or blows to the receptacle will be positively avoided. For conveniently carrying the device, the receptacle 1 is provided with a hand-hold in the nature of a bail 11. Since the supporting frame is arranged to be permanently attached to the receptacle, the latter will always have an elastic mounting, and the parts cannot be accidentally misplaced, as would be the case if the base were removable from the receptacle.

In the construction shown in Figs. 3 and 4, the base of the supporting frame is of larger diameter than the receptacle 12, so as to prevent the receptacle from coming in contact with other objects in the wagon being carried to market at the same time as the eggs. The base comprises a ring 13 and radial cross pieces 14 attached at their ends to the ring. The guiding post 15 for the receptacle is made of a single strip of metal bent in the shape of an inverted U and terminating at its ends in lateral extensions 16 that are soldered, or otherwise suitably secured, to one of the cross pieces 14. The receptacle 12 is provided with a central sleeve 17, similar to the construction first described, into which the post 15 extends. At the upper end of the post, and between the parallel portions 18 thereof, is mounted a pulley 19 that affords a large convex bearing for the suspension spring 20. The spring 20 is preferably made of one piece attached at its lower ends to the bottom of the receptacle by the lugs 21 and extending around the pulley or bearing 19 at a point centrally between the ends that are attached to the lugs 21. The spring 20 has sufficient tension to cushion the loaded receptacle during ordinary shocks, so that the bottom of the receptacle will not come in contact with the base of the supporting frame. To provide for severe shocks, an auxiliary cushioning or buffing device is arranged on the base of the supporting frame. This device takes the form of a leaf spring 22 secured at its center to one of the cross pieces 14 and having its ends bent upwardly so as to be free from the supporting base. The bottom of the receptacle 12 is adapted to come in contact with the free outer portions of the spring 22, so that the spring will yield under the weight of the receptacle and cushion the downward movement of the receptacle brought about by severe jolting.

The bail by which the egg carrier is lifted and carried is attached to the supporting frame, so that the egg receptacle will be yieldingly suspended at all times. For this purpose, two vertically disposed rods 23 are employed which are arranged at diametrically opposite points at the exterior of the receptacle and rigidly secured at their lower ends to one of the cross pieces 14 of the base. The upper ends of the rods 23 are bent into eyes 24 for connection with the bail 25. Extending horizontally from the exterior of the receptacle and located at the upper edge thereof at two diametrically opposite points are apertured lugs 26, through the aperture of each of which one of the rods 23 extends. The rods 23 are threaded through the apertured lugs 26 before the eyes 24 thereof are made, and after the said eyes are formed, the receptacle is thus permanently attached to the supporting frame, so that it cannot be removed. By means of the apertured lugs 26 engaging the lugs 23, the former assist in guiding the movement of the receptacle.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

1. In a device of the class described, a base, a standard rising therefrom, a receptacle having a centrally arranged guiding tube for the reception of the standard, and springs forming a connection between the standard and the receptacle and forming a cushioning means to prevent the transmission of shock from the base to the receptacle.

2. In a device of the class described, the combination of a receptacle having a central tubular member rising from the base thereof and of angular cross section, a standard extending through the sleeve and coöperating with the latter for preventing relative rotation between the receptacle and standard, and means for cushioning the receptacle with respect to the standard.

3. In a device of the class described, the combination of a receptacle having a vertically extending sleeve, a standard extending through the sleeve, means arranged to prevent the receptacle from drawing off the standard, and a cushioning means disposed within the sleeve for elastically supporting the receptacle on the standard.

4. In a device of the class described, the combination of a receptacle having a vertically extending sleeve open at both ends, a standard extending upwardly through the sleeve and forming a guide for the sleeve and receptacle, and an extension spring in the sleeve and arranged to yieldingly support the receptacle.

5. In a device of the class described, the combination of a receptacle having an opening in its bottom, a sleeve of angular cross section rising from the bottom of the receptacle at the opening thereof, a supporting frame having a standard of angular cross section extending through the sleeve and coöperating therewith for preventing relative rotary movement between the receptacle and frame, a cushioning device for elastically suspending the receptacle on the standard, and an auxiliary cushioning device on the base of the frame.

6. In a device of the class described, a supporting frame comprising a base, vertically disposed rods attached to the base, a bail hingedly connected to the upper ends of the rods, and a cushioning device on the said base, in combination with a receptacle disposed over the said device and between the rods, and means on the receptacle engaging the rods for guiding the movement of the receptacle.

7. In a device of the class described, a supporting frame comprising a base, a central post thereon composed of a strip bent into the shape of an inverted U, and a cushioning means on the post, in combination with a receptacle through which the post extends, and means for attaching the receptacle to the cushioning means.

8. In a device of the class described, a supporting frame comprising a circular base, a central post thereon, a cushioning device on the post, a second cushioning device on the base, upright members on opposite sides of the post and secured to the base, and a bail attached to the said members, in combination with a receptacle, a sleeve thereon through which the post extends, means on the exterior of the receptacle for engaging the said members, and means for attaching the receptacle to the cushioning device on the post.

In testimony that I claim the foregoing as my own, I have hereto affixed my signature in the presence of two witnesses.

CHARLES H. CRONK.

Witnesses:
   J. W. MELVIN,
   C. H. TANNER.